Nov. 5, 1935.                F. W. DE KAY                 2,019,524
                                BRAKE
                        Filed Aug. 18, 1933          2 Sheets-Sheet 1

INVENTOR
FRANK W. DEKAY
BY
ATTORNEYS

Nov. 5, 1935.  F. W. DE KAY  2,019,524
BRAKE
Filed Aug. 18, 1933  2 Sheets-Sheet 2
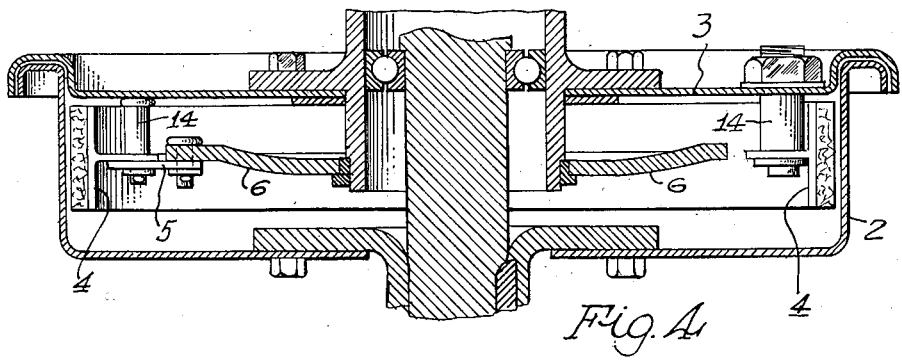
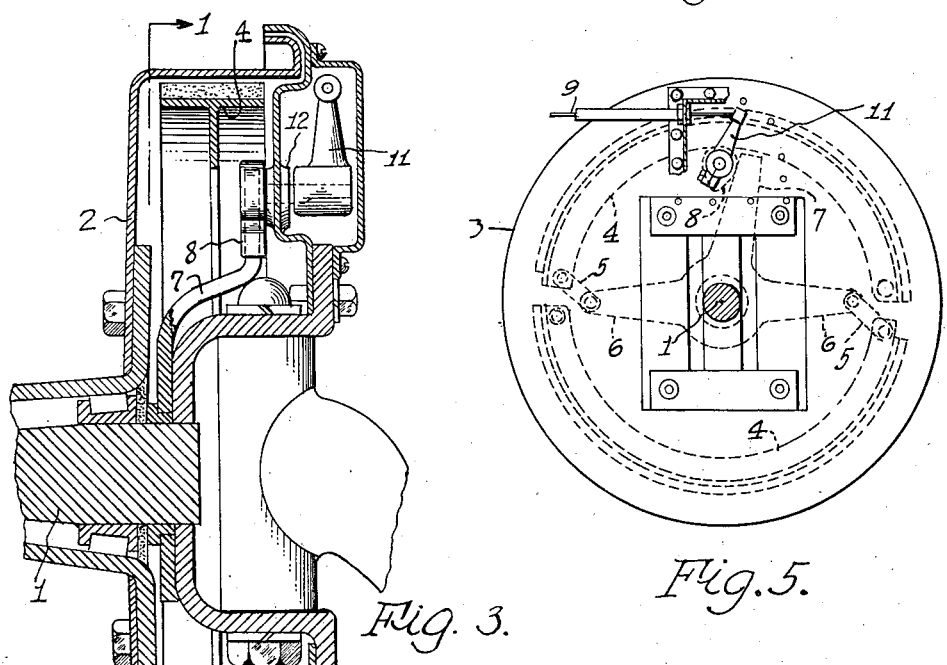
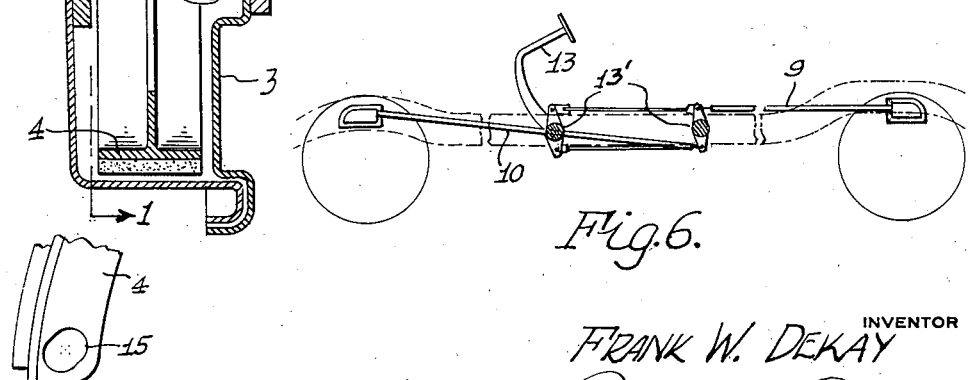
INVENTOR
FRANK W. DEKAY
BY
ATTORNEYS Patented Nov. 5, 1935

2,019,524

UNITED STATES PATENT OFFICE 2,019,524

BRAKE

Frank W. De Kay, Detroit, Mich.

Application August 18, 1933, Serial No. 685,663

1 Claim. (Cl. 188—78)

This invention relates to vehicle brakes of the self energizing type wherein it is the object to provide brake elements and actuating means therefor which will impose positive and uniform pressures over a very substantial portion of the brake drum, the entire surface of the shoes being arranged for self energization when braking in a forward direction while depending upon manual actuating pressure for braking in reverse direction.

Another object is to provide means at the pivotal points of the brake shoes to compensate for wear in such manner that the brake elements will be fed radially into the brake drum in automatic accord with the amount of wear thereby maintaining a uniform thickness of the brake elements at all times and after any period of wear.

Another object is to provide a brake actuating web for rotation about the axis of the drum in order to apply the brakes, and actuating means for this web in the form of a cam. By this arrangement I obtain a longer effective leverage than can be obtained by the usual crank type connection and hence am able to construct a more compact and sturdy brake assembly.

It is another object to provide a brake which will be truly self energizing and which will, by virtue of the floating pivots, be of long life, and which will, because of the few parts necessary be cheap to construct and easy to service.

Other objects and advantages either directly described or indirectly implied from the favorable arrangement of parts will become hereinafter more fully apparent as reference is had to the accompanying drawings wherein my invention is illustrated, by way of example and in which, Figure 1 is a vertical section taken along the line 1—1 of Fig. 3;

Fig. 3 is a vertical transverse view taken along the line 3—3 of Fig. 1;

Fig. 4 is a transverse section similar to Fig. 1 showing the rear driving axle;

Fig. 5 is a somewhat diagrammatic view of my complete brake showing the entire assembly;

Fig. 6 is a schematic showing of the brake lever actuating mechanism, and

Fig. 7 is an enlarged detail of the brake shoe pivotal end.

Figure 2:
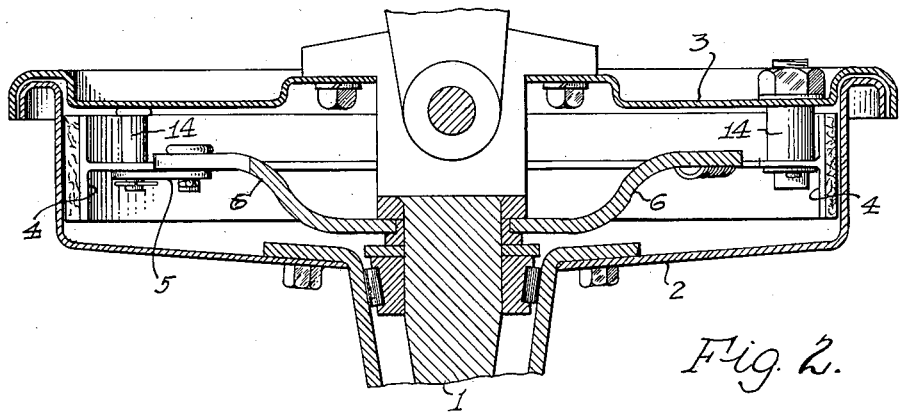
Fig. 2 is a transverse view taken along the line 2—2 of Fig. 1.

More particularly, 1 indicates a wheel spindle having a brake drum 2 mounted thereon for rotation with a vehicle wheel. The drum 2 is enclosed at its open end by a dust shield 3 and in the enclosure is a brake mechanism comprising brake shoes 4 each pivotally mounted at one end on pivots to be hereinafter more fully described, which are spaced approximately a hundred and eighty degrees from each other. The other end of each shoe is connected by a link 5 to an arm 6 rotatable about the axis of rotation of the drum 2. A further arm 7, integral with the arms 6, serves as a lever through which a cam 8 rotates the arms for actuation of the shoes 4. It will thus be seen that the leverage of applying the brakes centers about a sturdy support on the axis of rotation of the drum. It will be seen further that the length of the arm 7 is conducive to smooth action which is difficult to obtain by shorter leverage or absence of leverage in favor of a straight manual pull such as is sometimes encountered. It will be still further seen that by using a cam as the lever actuating means that I obtain a crank motion in a small and compact space such as could not be obtained were a true crank substituted therefor.

It is contemplated that the brake be so mounted that a line drawn through the two brake pivots will be substantially horizontal. By so doing, the cam actuating rods 9 and 10 for the front and rear brakes respectively can be substantially horizontal and the pull exerted by the cam can thus be a gradual pull of progressively increasing intensity which will find a major reactance against the wheel axle instead of a less sturdy dust shield. As seen in Fig. 5 the rod 9 (and 10) is connected to the cam by the rocker link 11 and the shaft of the cam is journalled in the dust shield at 12. A conventional pedal 13 and rocker shaft 13' may be employed, as is well known in the art.

Upon rotation of the cam 8 in response to pressure on the pedal 13 the arm 7 and also the arm 6 are rotated and the brake shoes 4 are urged outwardly in rotating about the pivots until contact is made with the drum 4 whereupon further pressure creates braking friction. When the brake drum is rotating in a counter-clockwise or forward direction (Figure 1) and hence in the direction of the pivots the brake will be self energizing as to both shoes, and when rotation of the drum is clockwise there will be no self energization of either shoe. Since the self energization is so decided in the construction shown, there is a vast difference between the pedal pressure necessary for a given speed for forward and reverse direction. The springs 17 are the usual take off springs to relieve contact of the shoes with the drum upon relief of pedal pressure.

Figure 1:
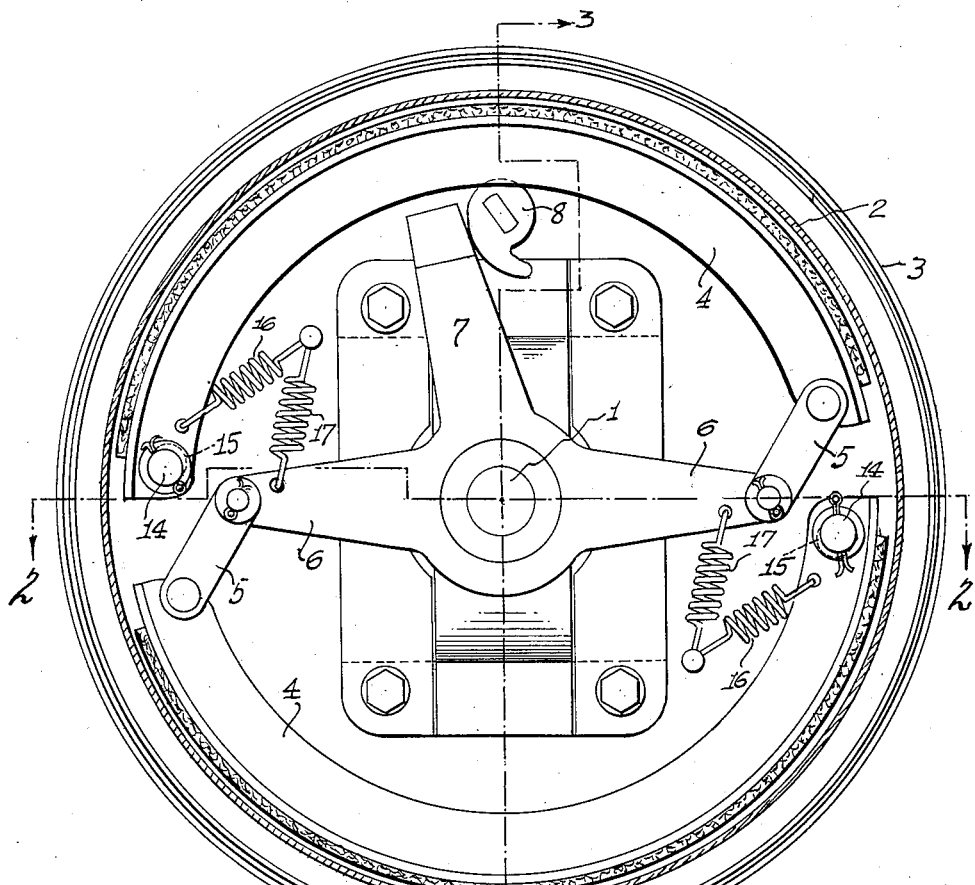

The pivots 14 for the brake shoes which will not be described are rigid with the dust shield 3. Each shoe is provided with an opening 15 for receiving its pivot and the openings are slotted as best shown in Fig. 7. As shown in Fig. 1 these slots 15 are preferably at an angle of about forty-five degrees to the horizontal. Thus, when the shoes 4 are expanded against the drum 2 friction urges the shoes in the direction of the pivots 14 and the slot 15 allows an actual movement in this direction sufficient to carry the shoe radially of the drum in order that the entire brake lining of the shoe will uniformly contact the drum. I have found it satisfactory in practice to provide a radial movement, as described, equal to approximately half the thickness of the brake shoe. The angularity and length of the slot may be varied as desired to obtain similar results.

It will be understood that there will be no travelling movement of the slot on its pivot until after a frictional engagement of the drum and shoe, and in order that the travel of the slot to its original position may occur before a release of the shoe from the drum in relieving braking pressure. I provide take off springs 16 as illustrated, which are sufficiently strong to accomplish this. The springs 16, of course, are the means for preventing initial movement of the slot prior to self energization of the brake. According to this arrangement, no adjustment of the brake internally is ever necessary. As the shoes wear, slack may be taken out of the pedal movement either by a pedal adjustment or by a suitable means for shortening the rods 9, 10. It may be noted, also, that chattering of the brake is caused by uneven wearing of the brake band and that this brake, due to uniform wear does not ever chatter.

Various modifications may be made without departing from the spirit of my invention and I therefore desire to be limited in my protection only by the scope of the appended claim.

What I claim is:—

In a brake, a brake drum, brake shoes pivotally mounted at one end for rotation against said drum, said drum and shoes being so arranged that forward direction of rotation of the drum is directed toward the pivots of said shoes for self energization thereof upon actuation of said shoes, a plurality of levers each integral with a hub portion, one of said levers being adapted to receive actuation, links connecting the other of said levers to the free end of said shoes, a take off spring connecting each of said shoes with its actuating lever, a cam for actuation of said first named lever, and manual means for rotation of said cam, said brake shoes each having a slotted connection with their pivots to provide a floating engagement therewith, said shoes being adapted to ride outwardly against said drum in said slotted connection as the shoe pressure increases under self energization, and a strong spring opposing the travel of said shoes along their slotted connection.

FRANK W. DE KAY.